United States Patent
Zeng et al.

(10) Patent No.: US 12,131,463 B2
(45) Date of Patent: Oct. 29, 2024

(54) INFORMATION PROCESSING DEVICE

(71) Applicant: OMRON Corporation, Kyoto (JP)

(72) Inventors: Xiangyu Zeng, Kyoto (JP); Atsushi Hashimoto, Tokyo (JP)

(73) Assignee: OMRON Corporation, Kyoto (JP)

( * ) Notice: Subject to any disclaimer, the term of this patent is extended or adjusted under 35 U.S.C. 154(b) by 385 days.

(21) Appl. No.: 17/621,391

(22) PCT Filed: Jun. 23, 2020

(86) PCT No.: PCT/JP2020/024568
§ 371 (c)(1),
(2) Date: Dec. 21, 2021

(87) PCT Pub. No.: WO2021/006030
PCT Pub. Date: Jan. 14, 2021

(65) Prior Publication Data
US 2022/0358642 A1 Nov. 10, 2022

(30) Foreign Application Priority Data
Jul. 9, 2019 (JP) .................. 2019-127655

(51) Int. Cl.
*G06T 7/00* (2017.01)
*G06V 10/82* (2022.01)

(52) U.S. Cl.
CPC ............ *G06T 7/0012* (2013.01); *G06V 10/82* (2022.01); *G06T 2207/20081* (2013.01); *G06T 2207/20084* (2013.01); *G06T 2207/30188* (2013.01)

(58) Field of Classification Search
CPC ...................... G06N 3/045; G06N 3/08; G06T 2207/20081; G06T 2207/20084; G06T 2207/30188
See application file for complete search history.

(56) References Cited

U.S. PATENT DOCUMENTS

| 2019/0124853 A1 | 5/2019 | Serizawa |
| 2019/0308915 A1 | 10/2019 | Serizawa |

(Continued)

FOREIGN PATENT DOCUMENTS

| JP | 2018028795 A | 2/2018 |
| JP | 2018029568 A | 3/2018 |

(Continued)

OTHER PUBLICATIONS

Hasan et al. "Detection and analysis of wheat spikes using convolutional neural networks." Plant Methods 14 (Nov. 2018): 1-13. (Year: 2018).*

(Continued)

*Primary Examiner* — Katrina R Fujita
(74) *Attorney, Agent, or Firm* — ROSSI, KIMMS & McDOWELL LLP

(57) ABSTRACT

An information processing apparatus calculates an index for a plant growth state with a neural network using fewer images to achieve training of the neural network. The apparatus includes first to N-th image analyzers (N≥2) each analyzing a cultivation area image of a plant cultivation area with a neural network to calculate a state index indicating a growth state of the plant in the cultivation area and including the neural network trained using cultivation area images each having a predetermined growth index classified into a corresponding class of first to N-th growth index classes, and a selector receiving an input of a cultivation area image for which the state index is calculated and causing one of the first to N-th image analyzers trained using cultivation area images classified into the same growth index class as the input cultivation area image to analyze the input cultivation area image.

4 Claims, 4 Drawing Sheets

(56) References Cited

U.S. PATENT DOCUMENTS

| | | | | |
|---|---|---|---|---|
| 2021/0183045 A1* | 6/2021 | Iwasawa | ................ | G06F 18/22 |
| 2022/0053122 A1* | 2/2022 | Scheiner | ............... | G06Q 50/02 |
| 2022/0139092 A1* | 5/2022 | Hashimoto | .......... | G06V 10/774 |
| | | | | 382/156 |

FOREIGN PATENT DOCUMENTS

| | | |
|---|---|---|
| JP | 2019071802 A | 5/2019 |
| WO | 2017104841 A1 | 6/2017 |

OTHER PUBLICATIONS

International Search Report issued in International Application No. PCT/JP2020/024568 mailed on Sep. 15, 2020. English translation provided.

Written Opinion issued in International Application No. PCT/JP2020/024568 mailed on Sep. 15, 2020. English translation provided.

Extended European Search Report issued in European Appln. No. 20836374.7 mailed Jun. 5, 2023.

Yahata et al. "A Hybrid Machine Learning Approach to Automatic Plant Phenotyping for Smart Agriculture", 2017 International Joint Conference on Neural Networks (IJCNN), IEEE, May 14, 2017: 1787-1793.

Lee et al. "Foreground Extraction Algorithm for Monocotyledonous Plants based on CNN and CRF", 2018 15th International Conference on Ubiquitous Robots (UR), IEEE, Jun. 27-30, 2018: 497-500.

\* cited by examiner

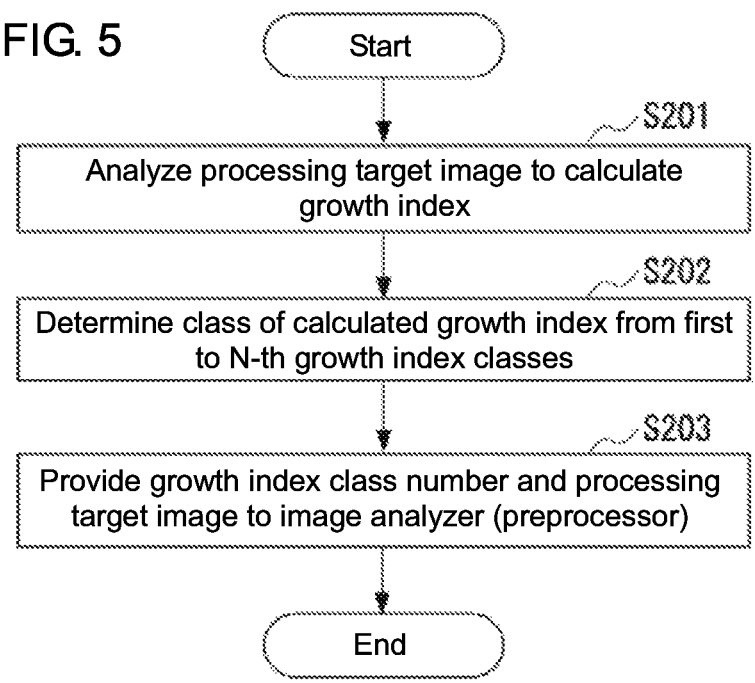

INFORMATION PROCESSING DEVICE

TECHNICAL FIELD

The present invention relates to an information processing apparatus that calculates an index for the growth state of a plant through image analysis using artificial intelligence (AI).

BACKGROUND

Image analysis using AI has been used to calculate an index for the growth state of a plant (refer to, for example, Patent Literature 1).

CITATION LIST

Patent Literature

Patent Literature 1: Japanese Unexamined Patent Application Publication No. 2018-29568

SUMMARY OF THE INVENTION

Problems to be Solved by the Invention

To calculate an index for the growth state of a plant through AI image analysis, multiple images with predetermined dimensions are input into a neural network such as a convolutional neural network (CNN) for training. However, plants change their appearance greatly as they grow. Thus, training a neural network for calculating an index for the growth state of the plant uses numerous images.

In response to the above issue, one or more aspects of the present invention are directed to an information processing apparatus that calculates an index for the growth state of a plant with a neural network using fewer images to achieve training of the neural network.

Solution to Problem

An information processing apparatus according to one aspect of the present invention includes first to N-th image analyzers, where N 2, and a selector. Each of the first to N-th image analyzers analyzes a cultivation area image of a cultivation area of a plant with a neural network to calculate a state index indicating a growth state of the plant in the plant cultivation area. Each of the first to N-th image analyzers includes the neural network trained using a plurality of cultivation area images each having a predetermined growth index classified into a corresponding class of first to N-th growth index classes. The selector receives an input of a cultivation area image for which the state index is to be calculated and causes an image analyzer of the first to N-th image analyzers to analyze the input cultivation area image. The image analyzer is trained using a plurality of cultivation area images classified into the same growth index class as the input cultivation area image.

More specifically, the information processing apparatus includes the neural networks (image analyzers) each for a different growth index class to calculate the state index indicating the growth state of the plant in a cultivation area. Training a single neural network to accurately calculate the state index for any rate of plant growth uses numerous images. However, the neural networks each for a different growth index class can be trained without using images unsuited to the training of the neural network. The information processing apparatus with the above structure can thus achieve training of the neural network in each image analyzer using fewer images.

In the information processing apparatus, the neural network included in an i-th image analyzer may be a neural network #i that receives an input of an image having a vertical pixel count of $H_i$ and a horizontal pixel count of $W_1$, where i is an integer from 1 to N. The i-th image analyzer may extract, from cultivation area images to be analyzed, a plurality of images with an aspect ratio of $H_i:W_i$, where i is an integer from 1 to N. The i-th image analyzer may adjust a pixel count of each of the extracted plurality of images for input into the neural network #i. Plants typically grow in height. Thus, in the information processing apparatus, a (k+1)-th growth index class may indicate a higher rate of growth than a k-th growth index class, where k is an integer from 1 to N−1. The neural networks #i to #N may each receive an input of an image with dimensions satisfying $H_{i+1}/W_{i+1} > H_i/W_i$ for an integer i from 1 to N−1.

The predetermined growth index may be a representative value of a height of the plant (the average or the mode of the plant heights) in the plant cultivation area. The representative value may be provided separately from the cultivation area image or calculated through analysis of the cultivation area image.

An information processing apparatus according to another aspect of the present invention (hereafter, a second information processing apparatus) is an apparatus for calculating a state index indicating a growth state of a plant. The apparatus includes a neural network and a calculator. The neural network calculates the state index. The neural network is trained by receiving inputs of cultivation area images extracted from a plurality of cultivation area images of a cultivation area of the plant. Each of the plurality of cultivation area images is classified into a corresponding growth index class of first to N-th growth index classes, where N 2. Each of the extracted cultivation area images has dimensions corresponding to a growth index class of a growth rate of the plant in the extracted cultivation area image. The calculator calculates the state index by extracting, from cultivation area images for which the state index is to be calculated, a cultivation area image having dimensions corresponding to a growth index class of a growth rate of the plant in the cultivation area image and inputting the extracted cultivation area image into the neural network.

More specifically, the information processing apparatus extracts, from multiple cultivation area images of a plant cultivation area, a cultivation area image with dimensions corresponding to the growth index class of the growth rate of the plant in the cultivation area image and inputs the extracted image into the neural network such as a fully convolutional network (FCN). The neural network can thus be trained without using images unsuited to the training. The second information processing apparatus can thus achieve training of the neural network in the image analyzer using fewer images.

In the second information processing apparatus, a (k+1)-th growth index class may indicate a higher rate of growth than a k-th growth index class, where k is an integer from 1 to N−1. The dimensions corresponding to each of the first to N-th growth index classes may satisfy $H_{i+1}/W_{i+1} > H_i/W_i$ for an integer i from 1 to N−1, where $H_i$ and $W_i$ are vertical and horizontal pixel counts of dimensions corresponding to an i-th growth index class.

Advantageous Effects

The information processing apparatus according to the above aspects of the present invention calculates an index for the growth state of a plant with a neural network using fewer images to achieve training of the neural network.

BRIEF DESCRIPTION OF THE DRAWINGS

FIG. 5 is a flowchart showing a growth index class determination process performed by an analysis controller in the information processing apparatus according to the second embodiment.

DETAILED DESCRIPTION

Embodiments of the present invention will now be described with reference to the drawings.

First Embodiment

Figure 1:
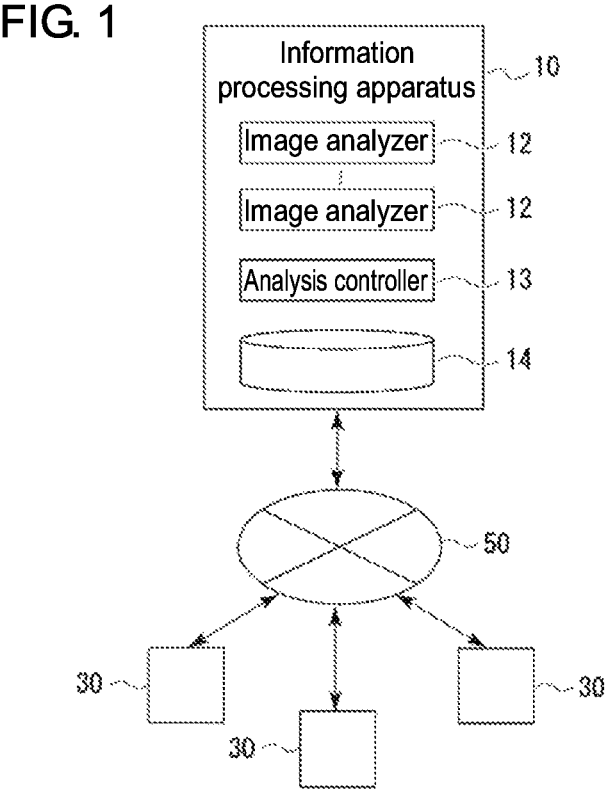
FIG. 1 is a diagram of an information processing apparatus according to a first embodiment of the present invention, describing its structure and use.

FIG. 1 is a diagram of an information processing apparatus 10 according to a first embodiment of the present invention, describing its structure and use.

The information processing apparatus 10 according to the present embodiment calculates an index for the growth state of a plant in a plant cultivation area of each user based on a result of imaging of the plant cultivation area transmitted from a user terminal 30 of each user through the Internet 50. As illustrated, the information processing apparatus 10 includes multiple image analyzers 12, an analysis controller 13, and a cultivation area management database 14. The information processing apparatus 10 is a relatively advanced computer, or for example, a computer including one or more high performance graphics processing units (GPUs) programmed to function as an apparatus that includes the multiple image analyzers 12, the analysis controller 13, and the cultivation area management database 14. The specific hardware configuration of the information processing apparatus 10 is not described. The multiple image analyzers 12 included in the information processing apparatus 10 may hereafter be referred to as first to N-th image analyzers 12 (N is the total number of image analyzers 12 included in the information processing apparatus 10).

The cultivation area management database 14 is a database for managing information about the cultivation area of each user. The cultivation area management database 14 also stores authentication information (e.g., a user ID and a password) set for each user.

An i-th (i=1 to N) image analyzer 12 analyzes a result of imaging of a plant cultivation area (hereafter, a cultivation area image) with a neural network #i to calculate an index for the growth state of the plant (hereafter, a state index) in the cultivation area.

Figure 2:
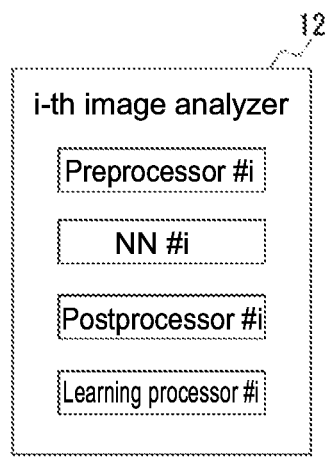
FIG. 2 is a diagram of an image analyzer included in the information processing apparatus according to the first embodiment.

More specifically, as shown schematically in FIG. 2, the i-th (i=1 to N) image analyzer 12 includes a preprocessor #i, a neural network (NN) #i, a postprocessor #i, and a learning processor #i.

The neural network #i is, for example, a convolutional neural network (CNN) that receives inputs of images with a vertical pixel count of $H_i$ and a horizontal pixel count of $W_i$. The dimensions of the images input into each of the neural networks #1 to #N are defined to satisfy $H_{i+}>H_1/W_1$, for each of integers j from 1 to N−1. When the neural networks #1 to #N are implemented by one or more GPUs, the input image dimensions (total count of pixels) for the neural networks #1 to #N may be specifically set to allow the GPUs to perform sufficiently. Examples of such input image dimensions include $H_1=64$, $W_1=1028$, $H_2=128$, $W_{2=512}$, $H_{3=256}$, $W_{3=256}$ when N=3.

The preprocessor #i (i=1 to N) extracts, from cultivation area images provided from the analysis controller 13 (described in detail later) as processing targets, multiple images with an aspect ratio of $H_i:W_i$ and converts each extracted image into an image with the vertical pixel count of $H_i$ and the horizontal pixel count of $W_i$ for input into the neural network #i. The postprocessor #i stores, into the cultivation area management database 14, the average of a group of indices output from the neural network #i in response to every input of an image performed by the preprocessor #i. The average is stored as the state index for a processing target area.

The learning processor #i (i=1 to N) trains the neural network #i using training data including many cultivation area images each having a growth index classified into an i-th growth index class and state indices each to be calculated from a corresponding cultivation area image.

The growth index herein refers to the rate (high or low) of growth of a plant in a cultivation area. For example, the growth index is a representative height (the average or the mode of the plant heights) of the plant in the cultivation area. The first to N-th growth index classes are predetermined to have greater class numbers (the i value in the i-th growth index class) for greater growth indices (higher rates of growth). Training the neural network #i refers to determining the weight and bias of each node in the neural network #i to minimize a predetermined evaluation function. Similarly to the preprocessor #i, the learning processor #i extracts, from cultivation area images, multiple images with an aspect ratio of $H_i:W_i$ and converts each extracted image into an image with the vertical pixel count of $H_i$ and the horizontal pixel count of $W_i$ for input into the neural network #i.

The analysis controller 13 receives, through a process including user authentication, cultivation area images transmitted from the user terminals 30 as cultivation area images (hereafter, processing target images) of cultivation areas for which the state indices are to be calculated (hereafter, processing target areas).

Figure 3:
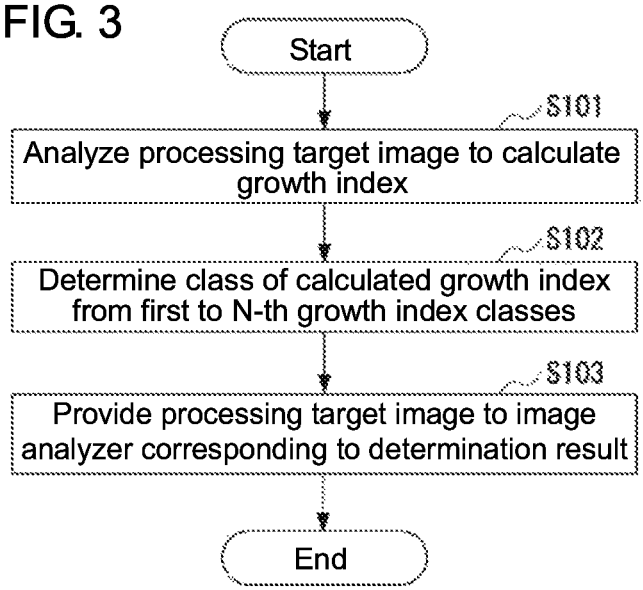
FIG. 3 is a flowchart showing an analyzer selection process performed by an analysis controller in the information processing apparatus according to the first embodiment.

The analysis controller 13 performs an analyzer selection process with the procedure shown in FIG. 3 upon receiving an input of a processing target image.

In other words, the analysis controller 13 receiving the input of the processing target image first analyzes the processing target image to calculate the growth index (the average or the mode of the plant heights) (step S101). The analysis controller 13 then determines the class of the calculated growth index from the first to N-th growth index classes (step S102). The analysis controller 13 provides the processing target image to an image analyzer 12 corresponding to the determination result (step S103). More specifically, the analysis controller 13 provides a processing target image having a growth index classified into a k-th growth index class to a k-th image analyzer 12 and causes the k-th image analyzer 12 to calculate the state index for the processing target image. After step S103, the analysis controller 13 ends the analyzer selection process.

As described above, the information processing apparatus 10 according to the present embodiment includes the neural networks (image analyzers 12) each for a different growth index class to calculate the state index for a cultivation area (index for the growth state of the plant in a cultivation area). The information processing apparatus 10 uses a neural network that receives vertically longer input images in response to a higher rate of growth in the area for which the state index is to be calculated. Training a single neural network to accurately calculate the state index for any rate of plant growth uses numerous images. However, the neural networks each for a different growth index class and for different input image dimensions in accordance with the growth index class as described above can each be trained without using images unsuited to the training of the neural network. The information processing apparatus 10 according to the present embodiment can thus achieve training of the neural network in each image analyzer 12 using fewer images.

Second Embodiment

Figure 4:
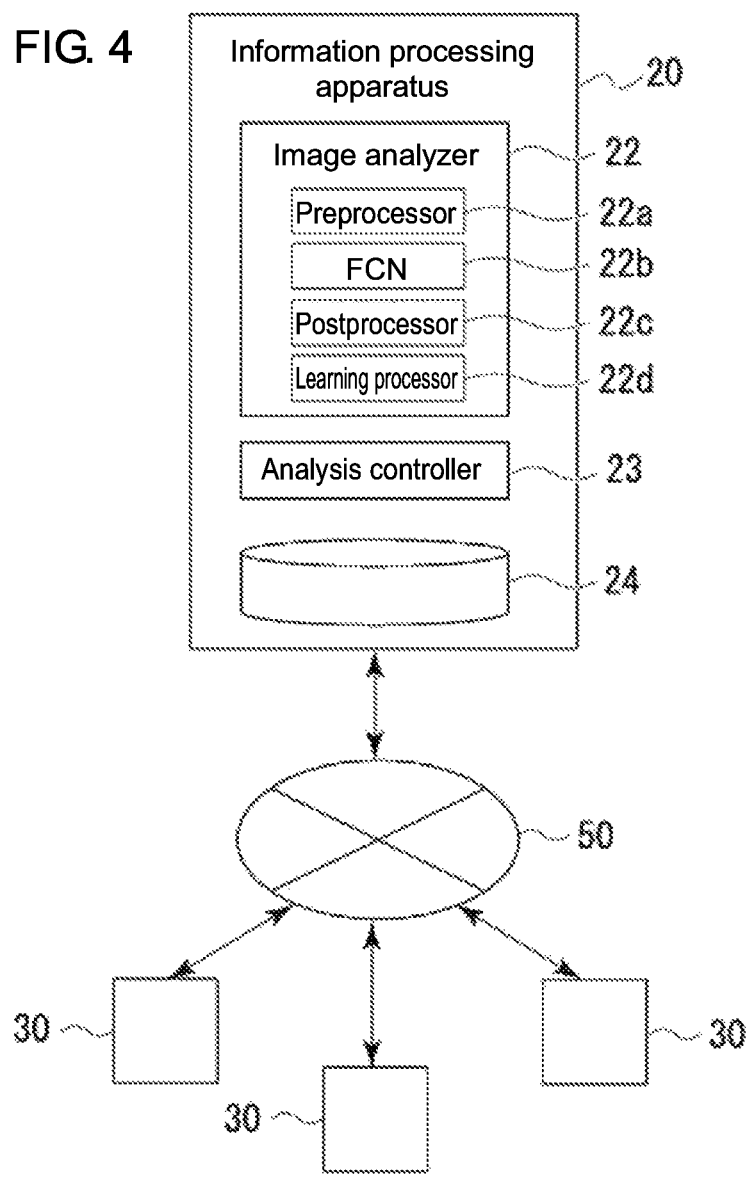
FIG. 4 is a diagram of an information processing apparatus according to a second embodiment of the present invention, describing its structure and use.

FIG. 4 is a schematic diagram of an information processing apparatus 20 according to a second embodiment of the present invention, describing its structure and use. Similarly to the information processing apparatus 10, the information processing apparatus 20 according to the present embodiment calculates an index for the growth state of a plant in the plant cultivation area of each user based on a result of imaging of the plant cultivation area transmitted from a user terminal 30 of each user through the Internet 50.

As illustrated, the information processing apparatus 20 includes an image analyzer 22, an analysis controller 23, and a cultivation area management database 24.

The cultivation area management database 24 is a database for managing information about the cultivation area of each user. The cultivation area management database 24 also stores authentication information (e.g., a user ID and password) set for each user.

The image analyzer 22 analyzes the imaging result of a plant cultivation area (hereafter, a cultivation area image) to calculate an index for the growth state of a plant (hereafter, a state index) in the cultivation area. As illustrated, the image analyzer 22 includes a preprocessor 22a, a fully convolutional network (FCN) 22b, a postprocessor 22c, and a learning processor 22d.

The FCN 22b is a neural network with all of its layers being convolutional layers, into which images with various dimensions can be input. The FCN 22b in the information processing apparatus 20 according to the present embodiment is implemented by multiple GPUs.

The preprocessor 22a extracts multiple images having an aspect ratio of $H_i:W_i$ from cultivation area images each input together with a class number i ($1 \leq i \leq N$) from the analysis controller 23 or the learning processor 22d and converts each extracted image into an image having a vertical pixel count of $H_i$ and a horizontal pixel count of $W_i$ for input into the FCN 22b.

The class number i, input into the preprocessor 22a together with a cultivation area image, is a value indicating a growth index class of a growth index for the cultivation area image among first to N-th growth index classes (or is the i value in the i-th growth index class). The growth index refers to the rate (high or low) of growth of a plant in a cultivation area. For example, the growth index is a representative height (the average or the mode of the plant heights) of the plant in the cultivation area.

The first to N-th growth index classes are predetermined to have greater class numbers for greater growth indices (higher rates of growth). The dimensions of the images extracted from the cultivation area images in each of the first to N-th growth index classes are defined to satisfy $H_{j+1}/W_{j+1} > H_j/W_j$ for each of integers j from 1 to N−1, where $H_i$ and $W_i$ are vertical and horizontal pixel counts of each image extracted from the cultivation area images included in an i-th ($1 \leq i \leq N$) growth index class. $H_i$ and $W_i$ (i=1 to N) are also defined to have a constant value for $H_i \times W_i$ for any i value.

While the preprocessor 22a is processing the cultivation area images of a cultivation area input from the analysis controller 23, the postprocessor 22c stores, into the cultivation area management database 24, the average of a group of indices output from the FCN 22b as the state index for the cultivation area.

The learning processor 22d trains the FCN 22b using training data including many cultivation area images and state indices each to be calculated from a corresponding cultivation area image. Training the FCN 22b herein refers to determining the weight and the bias of each node in the FCN 22b to minimize a predetermined evaluation function. The learning processor 22d trains the FCN 22b by determining, with the same procedure as in a growth index class determination process (FIG. 5) described later, the growth index class number of each cultivation area image and providing the determination result to the preprocessor 22a together with the cultivation area image.

The analysis controller 23 receives, through a process including user authentication, cultivation area images transmitted from the user terminals 30 as cultivation area images (hereafter, processing target images) of cultivation areas for which the state indices are to be calculated (hereafter, processing target areas).

The analysis controller 23 performs the growth index class determination process with the procedure shown in FIG. 5 upon receiving an input of a processing target image.

In other words, the analysis controller 23 receiving the input of the processing target image first analyzes the processing target image to calculate the growth index (the average or the mode of the plant heights) (step S201). The analysis controller 23 then determines the class of the calculated growth index from the first to N-th growth index classes (step S202). The analysis controller 23 provides the determination result (growth index class number) and the processing target image to the image analyzer 22 (preprocessor 22a) (step S203) to cause the image analyzer 22 to calculate the state index for the processing target image. After step S203, the analysis controller 23 ends the growth index class determination process.

The information processing apparatus 20 according to the present embodiment has the structure described above. The information processing apparatus 20 extracts, from multiple cultivation area images of a plant cultivation area, cultivation area images each with dimensions corresponding to the growth index class of the growth rate of the plant in the cultivation area image and inputs the extracted images into the FCN 22b. The FCN 22b can thus be trained without using images unsuited to the training. The information processing apparatus 20 according to the present embodiment can thus achieve training of the neural network (FCN 22b) in the image analyzer using fewer images.

Modifications

The information processing apparatuses 10 and 20 described above may be modified variously. For example, each image analyzer 12 in the information processing apparatus 10 according to the first embodiment may receive inputs of images with the same dimensions into the neural network, although more images are used in the training of each neural network.

The information processing apparatus 20 may include a neural network that includes one (one type of) convolutional layer and multiple fully connected layers (dense layers) to calculate the state index. Although the information processing apparatuses 10 and 20 calculate the growth indices through analysis of cultivation area images, the information processing apparatus 10 may receive inputs of cultivation area images and cultivation indices from the user terminals 30.

Appendix

An information processing apparatus (10), comprising:
first to N-th image analyzers (12), where N 2, the first to N-th image analyzers (12) each being configured to analyze a cultivation area image of a cultivation area of a plant with a neural network to calculate a state index indicating a growth state of the plant in the plant cultivation area, each of the first to N-th image analyzers (12) including the neural network trained using a plurality of cultivation area images each having a predetermined growth index classified into a corresponding class of first to N-th growth index classes; and
a selector (13) configured to receive an input of a cultivation area image for which the state index is to be calculated and to cause an image analyzer (12) of the first to N-th image analyzers (12) to analyze the input cultivation area image, the image analyzer (12) being trained using a plurality of cultivation area images classified into the same growth index class as the input cultivation area image.

An information processing apparatus (20) for calculating a state index indicating a growth state of a plant, the apparatus (20) comprising:
a neural network (22b) configured to calculate the state index, the neural network (22b) being trained by receiving inputs of cultivation area images extracted from a plurality of cultivation area images of a cultivation area of the plant, each of the plurality of cultivation area images being classified into a corresponding growth index class of first to N-th growth index classes, where N 2, each of the extracted cultivation area images having dimensions corresponding to a growth index class of a growth rate of the plant in the extracted cultivation area image; and
a calculator (22a, 23) configured to calculate the state index by extracting, from cultivation area images for which the state index is to be calculated, a cultivation area image having dimensions corresponding to a growth index class of a growth rate of the plant in the cultivation area image and inputting the extracted cultivation area image into the neural network (22b).

REFERENCE SIGNS LIST 10, 20 information processing apparatus
12, 22 image analyzer
13, 23 analysis controller
14, 24 cultivation area management database
30 user terminal
50 Internet

The invention claimed is:

1. An information processing apparatus, comprising:
first to N-th image analyzers, where N≥2, the first to N-th image analyzers each being configured to analyze a cultivation area image of a cultivation area of a plant with a neural network to calculate a state index indicating a growth state of the plant in the plant cultivation area, each of the first to N-th image analyzers including the neural network trained using a plurality of cultivation area images each having a predetermined growth index classified into a corresponding class of first to N-th growth index classes; and
a selector configured to receive an input of a cultivation area image for which the state index is to be calculated and to cause an image analyzer of the first to N-th image analyzers to analyze the input cultivation area image, the image analyzer being trained using a plurality of cultivation area images classified into the same growth index class as the input cultivation area image,
wherein the neural network included in an i-th image analyzer is a neural network #i configured to receive an input of an image having a vertical pixel count of Hi and a horizontal pixel count of Wi, where i is an integer from 1 to N,
the i-th image analyzer extracts, from cultivation area images to be analyzed, a plurality of images with an aspect ratio of Hi:Wi, where i is an integer from 1 to N, and the i-th image analyzer adjusts a pixel count of each of the extracted plurality of images by converting each extracted image into an image having a vertical pixel count of $H_i$ and a horizontal pixel count of $W_i$ for input into the neural network #i,
a (k+1)-th growth index class indicates a higher rate of growth than a k-th growth index class, where k is an integer from 1 to N−1, and
the neural networks #i to #N each receive an input of an image with dimensions satisfying Hi+1/Wi+1>Hi/Wi for an integer i from 1 to N−1.

2. The information processing apparatus according to claim 1, wherein
the predetermined growth index is a representative value of a height of the plant in the plant cultivation area.

3. The information processing apparatus according to claim 1, wherein
the predetermined growth index is a representative value of a height of the plant in the plant cultivation area calculated through analysis of the cultivation area image.

4. An information processing apparatus for calculating a state index indicating a growth state of a plant, the apparatus comprising:
a neural network configured to calculate the state index, the neural network being trained by receiving inputs of cultivation area images extracted from a plurality of cultivation area images of a cultivation area of the plant, each of the plurality of cultivation area images being classified into a corresponding growth index class of first to N-th growth index classes, where N≥2, each of the extracted cultivation area images having dimensions corresponding to a growth index class of a growth rate of the plant in the extracted cultivation area image; and
a calculator configured to calculate the state index by extracting, from cultivation area images for which the state index is to be calculated, a cultivation area image having dimensions corresponding to a growth index class of a growth rate of the plant in the cultivation area image and inputting the extracted cultivation area image into the neural network, wherein the calculator is configured to extract, from cultivation area images to be analyzed, a plurality of images with an aspect ratio of $H_i:W_i$, where i is an integer from 1 to N, and adjust a pixel count of each of the extracted plurality of images by converting each extracted image into an image having a vertical pixel count of $H_i$ and a horizontal pixel count of $W_i$, and a (k+1)-th growth index class indicates a higher rate of growth than a k-th growth index class, where k is an integer from 1 to N−1, and the dimensions corresponding to each of the first to N-th growth index classes satisfy $H_{i+1}/W_{i+1} > H_i/W_i$ for an integer i from 1 to N−1, where $H_i$ and $W_i$ are vertical and horizontal pixel counts of dimensions corresponding to an i-th growth index class.

* * * * *